US005156356A

United States Patent [19]

Fujimura et al.

[11] Patent Number: 5,156,356

[45] Date of Patent: Oct. 20, 1992

[54] SEAT BELT RETRACTOR WITH GRIPPING MEMBERS FOR SECURELY HOLDING SEAT BELT

[75] Inventors: Yoshiichi Fujimura; Shizutaka Matsuura, both of Shiga, Japan

[73] Assignee: Takata Corporation, Tokyo, Japan

[21] Appl. No.: 731,264

[22] Filed: Jul. 17, 1991

[30] Foreign Application Priority Data

Aug. 1, 1990 [JP] Japan .......... 2-204815

[51] Int. Cl.[5] .......... B60R 22/42; A62B 35/00

[52] U.S. Cl. .......... 242/107.2; 280/806; 297/478

[58] Field of Search .......... 242/107.2; 280/806, 280/807, 808; 297/478, 480

[56] References Cited

U.S. PATENT DOCUMENTS 3,834,496 9/1974 Takada .......... 242/107.2
5,029,770 7/1991 Tanaka et al. .......... 242/107.2

FOREIGN PATENT DOCUMENTS 2241326 3/1973 Fed. Rep. of Germany ... 242/107.2

*Primary Examiner*—Daniel P. Stodola
*Assistant Examiner*—John Q. Nguyen
*Attorney, Agent, or Firm*—Kanesaka and Takeuchi

[57] ABSTRACT

A seat belt retractor comprises a frame including a pair of opposite side walls and a rear wall extending between the side walls, a seat belt take-up reel extending between the side walls of the frame, a first gripping member mounted to the rear wall of the frame to grip a seat belt, a shaft extending between the side walls of the frame, a second gripping member having a support hole at one end to receive the shaft whereby the second gripping member is pivotally supported by the frame, the second gripping member being rotated between a position where the other, free end of the second gripping member is overlapped with the first gripping member and a position remote from the first gripping member, and locking means for moving the second gripping member to overlap with the first gripping member in emergency situations of a vehicle, wherein the second gripping member has a front edge to contact with the seat belt faster than any other portions when the second gripping member is rotated in such a direction as to grip the seat belt.

3 Claims, 6 Drawing Sheets

122'
18'
127'
126'
120'
h
134'
123'
124'
α
136'
138a'
138'
180'
a
16'
12'
129'
20'
30'
β
10'

114'
134'
144'
140'
180'
146'
152'
68'
156'
48'
56'
158'
154'
54'
38'
40'
40A'
127'
122'
129'
150'
44'
184'
28'
70'
66'
30'
16'
182'
14'
12'
20'
126'
123'
124'
138'
136'

SEAT BELT RETRACTOR WITH GRIPPING MEMBERS FOR SECURELY HOLDING SEAT BELT

BACKGROUND OF THE INVENTION

1. Field of the Invention

The present invention relates to a retractor for use in a vehicle seat belt system and particularly, to a seat belt retractor adapted to inhibit extraction of a seat belt in emergency situations such as collision.

2. Description of the Related Art

A motor vehicle conventionally includes a seat belt system mounted to a passenger's seat to protect a vehicle occupant in emergency situations such as collision. In such a seat belt system, an emergency lock type retractor is attached to a rigid member to take up a seat belt.

Such a retractor is designed to allow extraction of a seat belt when the seat belt is fastened around a vehicle occupant. The seat belt can also be extracted in non-emergency situations so as not to restrain movement of the occupant. In emergency situations such as collision, impact or sudden acceleration is sensed to actuate a reel lock mechanism so as to lock a reel around which the seatbelt is being wound. This allows the seat belt to restrain the vehicle occupant so as to inhibit sudden movement of the occupant or to protect the occupant.

The reel lock mechanism is operable to securely stop the reel per se around which the seat belt is wound. However, the seat belt may be extracted in the event that it is loosely wound around the reel. To prevent this, there has previously been proposed a seat belt retractor as shown in FIGS. 3 to 6.

As shown in FIGS. 3 and 4, a frame 10 includes a pair of parallel side walls 12 and 14, and a rear wall 16 extending between the side walls 12 and 14. A reel 20 and an emergency lock mechanism 22 are mounted to the lower portion of the frame 10 to take up a seat belt 18. A belt lock mechanism 24 is mounted to the upper portion of the frame 10 to inhibit extraction of the seat belt 18 at the time of emergency.

The reel lock mechanism 22 will now be described with reference mainly to FIG. 4.

The side walls 12 and 14 include coaxial support openings 26 and 28 through which a reel shaft 30 extends while passing through a bushing 32 made of synthetic resin and is rotated about its own axis.

A return spring 34 is connected at a central end to one end of the shaft 30. A cover 36 is disposed over the return spring 34 to secure one side of the return spring 34 to the side wall 12. Extraction of the seat belt 18 causes the reel 20 to rotate in a direction to store energy in the return spring 34. When the occupant releases his hand from the seat belt 18, the reel 20 is rotated under the biasing force of the return spring 34. Then, the seat belt 18 is automatically wound around the reel 20. It will be understood that the reel 20 and the reel shaft 30 are rotated in the direction of the arrow $A_1$ when the seat belt 18 is extracted.

The reel lock mechanism 22 is mounted to the outer surface of the side wall 14.

The reel lock mechanism 22 includes a ratchet wheel 38 integral with the other end of the reel shaft 30. The ratchet wheel 38 includes a pin 40 coaxial with the shaft 30. A tie plate 42 has an opening 43 fitting around the pin 40. A lock ring 44 has a central opening 48 in which the pin 40 is loosely fit. An arcuate spring element 50 has one end engaged with a central hole (spring hanger) 52 of the tie plate 42 and the other end engaged with a hole (spring hanger) 54 of the lock ring 44. The lock ring 44 has internal teeth 56. The spring element 50 extends between the spring hanger 54 of the lock ring 44 and the spring hanger 52 of the tie plate 42 and provides a biasing force to rotate the lock ring 44 in the direction of the arrow $A_2$.

A control lever 58 has a base end pivotally connected to the side wall 14 of the frame 10 by a pivot pin 60. The other, free end of the control lever 58 is engageable with the ratchet wheel 38. A pin 62 extends from one side of the control lever 58. The pivot pin 60 extends through an opening 64 which is formed in the front end of the tie plate 42.

The lock ring 44 has a pair of diametrically opposite integral tabs 66 and 68. The tab 66 is designed to rotate the control lever 58, whereas the tab 68 is designed to operate the belt lock mechanism 24.

The tab 66 of the lock ring 44 has an elongate hole 70 to receive the pin 62 of the control lever 58.

A hook retainer 72 is secured to the pin 40 of the shaft 30 which in turn, extends through the central opening 48 of the lock ring 44. A pair of diametrically opposite projections 76 and 78 extend from the peripheral edge of the hook retainer 72 to support a hook 74. The hook 74 has two openings 80 and 82 to receive the projections 76 and 78. This arrangement allows the hook 74 to reciprocate on a line extending between the projections 76 and 78 (shown by the arrows $B_1$ and $B_2$).

A compression coil spring 84 is disposed between the hook retainer 72 and the hook 74 to urge the hook 74 in the direction of the arrow $B_1$. A pawl 86 extends from the outer peripheral edge of the hook 74 to engage with the internal teeth 56 of the lock ring 44. A connecting pin 88 extends from one side of the hook 74.

The hook 74 is normally urged in the direction of the arrow $B_1$ by the compression coil spring 84. That is, the hook 74 is shifted to the left as shown in FIG. 4. This results in separation of the pawl 86 from the internal teeth 56.

A frictional engagement member 90 is substantially in the form of a ring. An opening 92 is formed adjacent to the outer peripheral edge of the frictional engagement member 90 to receive the connecting pin 88. A flywheel 96 is fit over the frictional engagement member 90 and includes a ratchet 94. The flywheel 96 has a central opening within which the pin 40 of the shaft 30 is loosely fit. The flywheel 96 is short and cylindrical in shape. The frictional engagement member 90 is fit within the flywheel 96. An arcuate spring 98 is fit on the outer periphery of the frictional engagement member 90 and urged against the inner periphery of the flywheel 96. Friction between the flywheel 96 and the frictional engagement member 90 enable sliding rotary motion of the flywheel 96. A hole 40A is formed in the leading end of the pin 40 to receive a rivet 96. This holds the flywheel 99 in place.

As shown in FIG. 3, an actuator 100 is mounted to the side wall 14 of the frame 10 and generally includes a case 104 fixed to the side wall 14, an operating element or barrel 106 loosely received in the case 104, an operating piece 110 having a protrusion 108 in contact with the upper surface of the operating barrel 106, and a support 112 by which the base end of the operating piece 110 is pivotally supported.

As shown in FIG. 3, a cover 114 surrounds the reel lock mechanism assembled in a manner shown in FIG. 4.

With the retractor of the seat belt thus constructed, the operating piece 110 is disengaged from the flywheel 96 when the seat belt is extracted by the vehicle occupant. This permits rotation of the reel 20 and the shaft 30 and thus, extraction of the seat belt 18. If the seat belt 18 is released, then the shaft 30 is rotated under the influence of the return spring 34 within the cover 36 so that the seat belt 18 may be wound around the reel 20.

If the speed of the vehicle is substantially changed due, for example, to collision, then the actuator 100 is rendered operative to inhibit extraction of the seat belt 18. Specifically, the operating barrel 106 is inclined when a substantial amount of acceleration is exerted on the actuator 100. This causes the protrusion 108 to push up the operating piece 110. A free end of the operating piece 110 is then brought into engagement with the ratchet 94. As a result, the flywheel 96 is prevented from rotating.

Stoppage of the flywheel 96 results in corresponding stoppage of the frictional engagement member 90. A vehicle collision causes extraction of the seat belt 18. This would result in rotation of the reel shaft 30 and thus, the hook retainer 72 and the hook 74 rotate in the direction of the arrow $A_1$. However, the hook 74 can not be rotated since the frictional engagement member 90 is prevented from rotating as a result of engagement with the pin 88. The hook 74 is slid in the direction of the arrow $B_2$ to the extent corresponding to the rotation of the hook retainer 72 in the direction of the arrow $A_1$. The pawl 86 is then brought into engagement with the internal teeth 56 of the lock ring 44.

Consequently, the lock ring 44 is rotated in the direction of the arrow $A_1$. Rotation of the tab 66 in the direction of the arrow $A_1$ causes the control lever 58 to rotate in the direction of the arrow $C_1$ since the pin 62 is engaged with the elongate hole 70. The free end of the control lever 58 is then brought into engagement with the ratchet wheel 38 of the reel shaft 30 so as to firmly lock the reel shaft 30 and the reel 20.

The construction of the belt lock mechanism 24 will next be described with reference to FIGS. 3, 4 and 5.

A first gripping member 120 is attached to the rear wall 16 of the frame 10 and includes a holder 123 vertically movable along the rear wall 16, a receiver 124 held by the holder 123, and a spring 126 disposed to urge the receiver in a downward direction. The receiver 124 has a rugged front surface.

122 is a guide member for guiding the seat belt 18. As shown in FIG. 6, the guide member or frame 122 has upper and lower slots 127 and 129 and is made of synthetic resin.

A pair of openings 130 and 132 are coaxially formed in the side walls 12 and 14 of the frame 10 to receive the shaft 134. A second gripping member 136 has a hole 137 through which the shaft 134 extends. Thus, the second gripping member 136 is rotatably mounted to the frame 10.

As shown in FIG. 5, a semicylindrical pusher 138 is attached to the free end of the second gripping member 136 and has a rugged surface in a face-to-face relation to the receiver 124. The seat belt 18 extends between the pusher 138 and the receiver 124.

A pin 140 (FIG. 3) extends from one side of the second gripping member 136 into an elongate hole 142 which is formed in the side wall 14 of the frame 10.

A rocker arm 146 is pivotally mounted to the outer side of the wall 14 of the frame 10 by a pivot pin 144. The rocker arm 146 is L-shaped and has a notch 148 at one end to receive the pin 140. The other end of the rocker arm 146 is pivotally connected to the upper end of a lever 150 to form a joint 152. The lever 150 is connected to the joint 152 of the rocker arm 146 in a manner to allow slight angular movement in a direction as indicated by E.

The lower end of the lever 150 is overlapped with the tab 68 of the lock ring 44. A pin 154 extends from the lower end of the lever 150 into an elongate hole 156 of the tab 68.

A spring 158 is mounted to the pivot pin 144 and has one end engaged with a hole 160 of the side wall 14 of the frame 10 and the other end engaged with a hole 162 of the rocker arm 146. The spring 158 urges the rocker arm 146 in the direction of the arrow $G_1$.

Operation of the belt lock mechanism 24 thus constructed is as follows.

In a non-emergency situation, the rocker arm 146 is urged in the direction of the arrow $G_1$ under the action of the spring 158 to push the pin 140 in the same direction. This causes the pusher 138 of the second gripping member 136 to separate from the receiver 124 so as to allow passing of the seat belt 18 between the pusher 138 and the receiver 124.

In emergency situations such as collision, the operating barrel 106 of the actuator 100 is inclined to cause the operating piece 110 to engage with the ratchet 94 of the flywheel 96 as mentioned earlier. As a result, the lock ring 44 is rotated in the direction of the arrow $A_1$. Then, the seat belt 18 will be locked in the following steps 1 to 5.

(1) Rotation of the tab 68 of the lock ring in the direction of the arrow $A_1$ results in downward movement of the pin 154 within the elongate hole 156, and thus, rotation of the lever 150 in a direction as indicated by E.

(2) The rotation of the lever 150 causes the free end **150*a* to engage with the ratchet wheel 38**.

(3) When the ratchet wheel 38 is rotated, the lever 150 is moved upwards. The rocker arm 146 is then rotated about the pivot pin 144 in a direction as indicated by $G_2$. The pin 140 is pushed in a direction as indicated by $G_2$ (The elongate hole 70 is so shaped that when the pin 140 is pushed in such a direction, the control lever 58 must not engage with the ratchet wheel).

(4) As a result, the second gripping member 136 is moved toward the first gripping member 120 so as to grip or sandwich the seat belt 18 between the pusher 138 and the receiver 124.

(5) Once the seat belt 18 is sandwiched between the pusher 138 and the receiver 124, extraction of the seat belt 18 urges the pusher 138 and the receiver 124 toward one another. As a result, the seat belt 18 is firmly gripped between the pusher 138 and the receiver 124 and can no longer be extracted.

In the prior art seat belt retractor, the seat belt 18 tends to slightly slide between the two gripping members 120 and 136 when the first gripping member 120 and the second gripping member 136 begin to grip the seat belt 18.

To present sliding motion of the seat belt 18, the pusher 138 or the receiver 124 could have a serrated surface to contact the seat belt. However, such a serrated surface presents a problem that the seat belt is rubbed to create a rough nap.

OBJECT AND SUMMARY OF THE INVENTION

It is an object of the present invention to provide a seat belt retractor which provides a better locking capability to rapidly and firmly sandwich a seat belt between two gripping members when locking is effected.

Another object of the present invention is to provide a seat belt retractor wherein a seat belt can smoothly be slid between two gripping members, and wherein the seat belt is in no way napped and is durable.

In accordance with the present invention, there is provided a seat belt retractor comprising a frame including a pair of opposite side walls and a rear wall extending between the side walls, a seat belt take-up reel extending between the side walls of the frame, a first gripping member mounted to the rear wall of the frame to grip a seat belt, a shaft extending between the side walls of the frame, a second gripping member having a support hole at one end to receive the shaft whereby the second gripping member is pivotally supported by the frame, the second gripping member being rotated between a position where the other, free end of the second gripping member is overlapped with the first gripping member and a position remote from the first gripping member, and operating means for moving the second gripping member to overlap with the first gripping member in emergency situations of a vehicle, wherein the second gripping member has a front edge to contact with the seat belt faster than any other portions when the second gripping member is rotated in such a direction as to grip the seat belt.

Also, in the present invention, when the front edge of the second gripping member is initially brought into contact with the seat belt, the angle $\alpha$ is less than 19°, and the angle $\beta$ is equal to or greater than 13°. The angle $\alpha$ is an angle between a line extending through the front edge and the central axis of the shaft and a line perpendicular to the rear wall of the frame and extending through the central axis of the shaft. The angle $\beta$ is an angle defined between the end surface of the second gripping member when the front edge is initially in contact with the seat belt and the rear wall of the frame.

With the seat belt retractor of the present invention, the front edge of the second gripping member cooperates with the first gripping member to grip the seat belt near a place where the perpendicular line extending from the central axis of the shaft intersects the rear wall of the frame. As such, the seat belt can be gripped between the two gripping members at the initial stage of a locking operation. Also, when the front edge of the second gripping member is brought into contact with the seat belt, a large angle is defined between the end surface of the second gripping member and the rear wall of the frame. In other words, the second gripping member comes into contact with the seat belt at a deep or large angle. This results in concentration of a gripping force on the front edge of the second gripping member. When a pulling force is applied from the seat belt to the second gripping member, the second gripping member is rotated in a direction toward the perpendicular line so as to rapidly sandwich the seat belt between the two gripping members.

DESCRIPTION OF THE PREFERRED EMBODIMENTS

Figure 1:
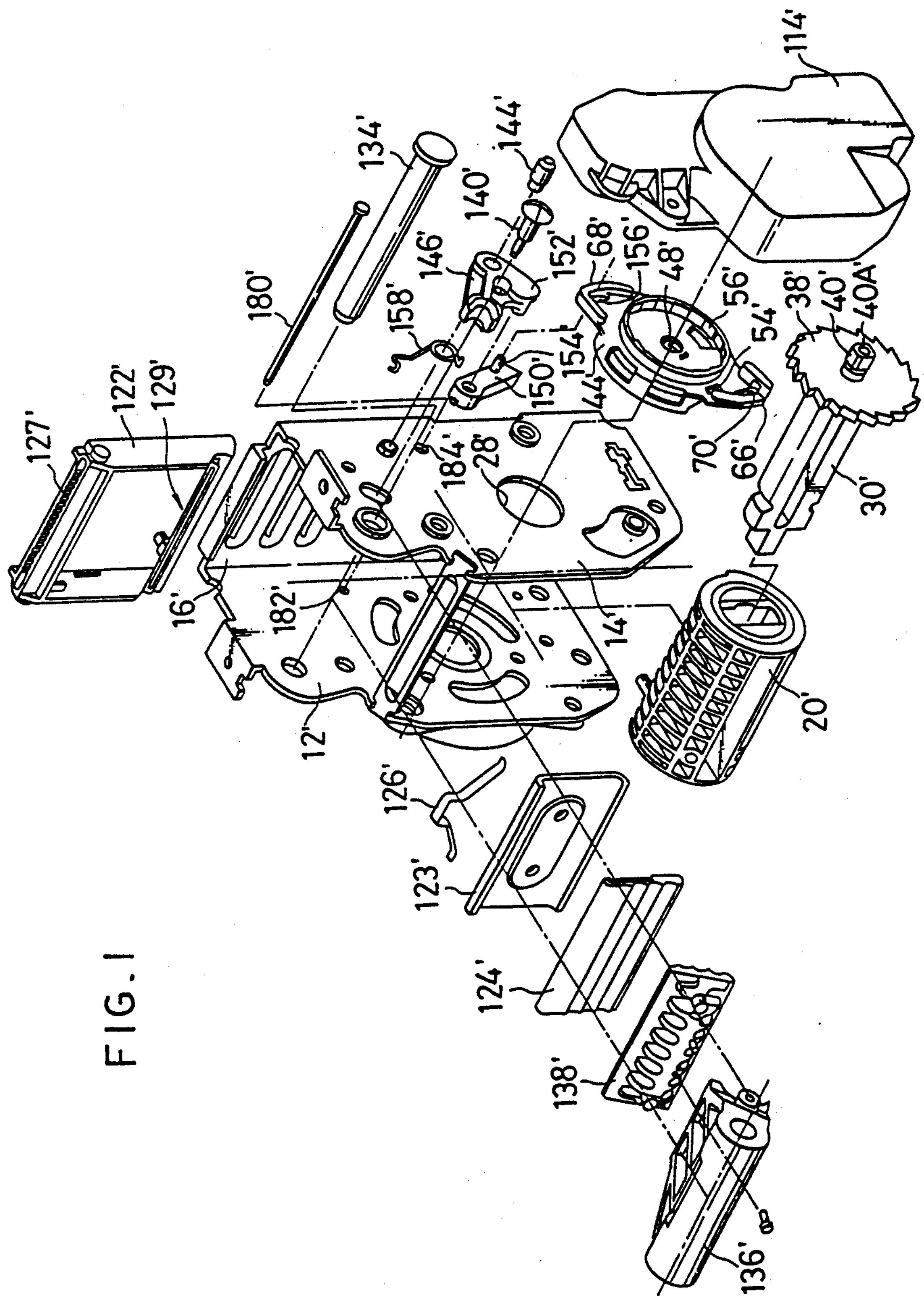
FIG. 1 is an exploded perspective view of a seat belt retractor according to one embodiment of the present invention.
Figure 2:
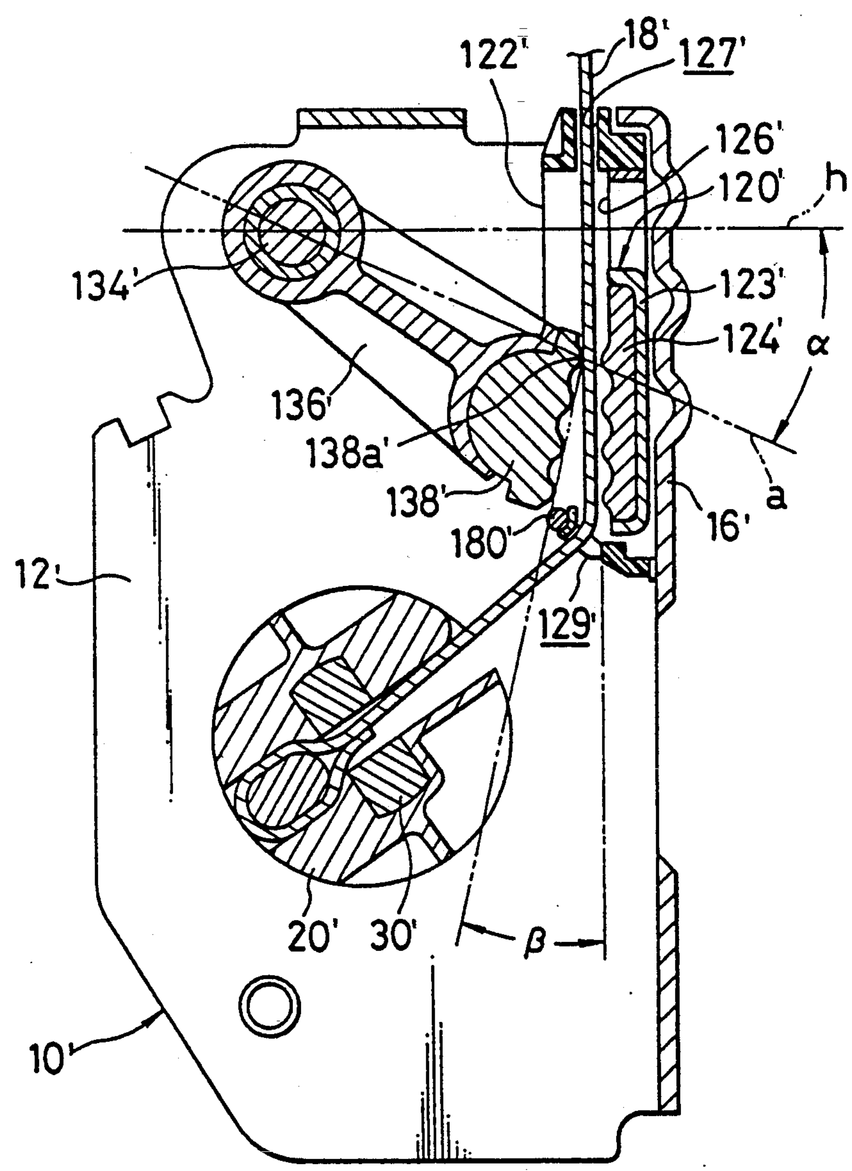
FIG. 2 is a vertical sectional view of the retractor.
Figure 3:
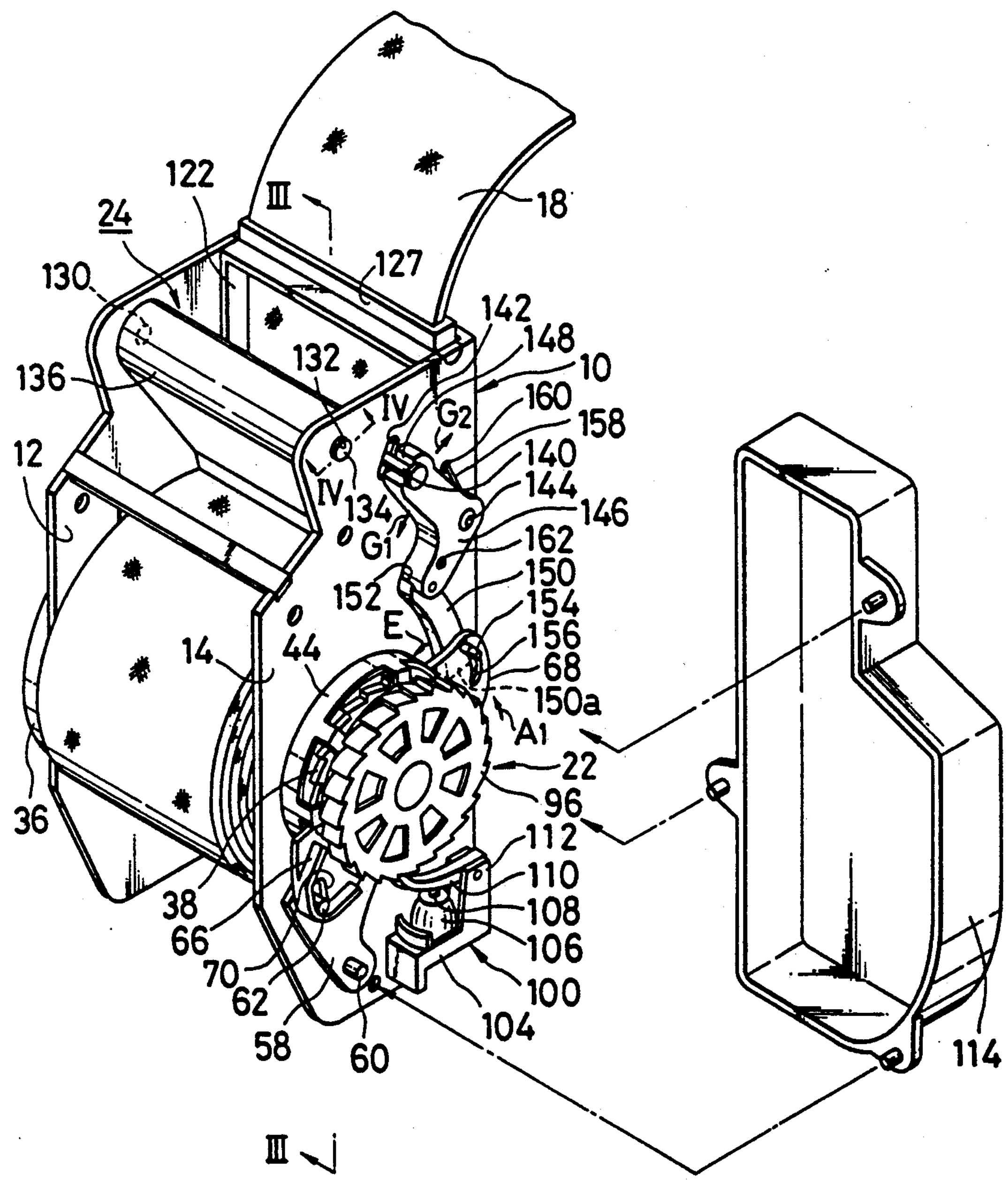
FIG. 3 is a perspective view of a conventional retractor.
Figure 4:
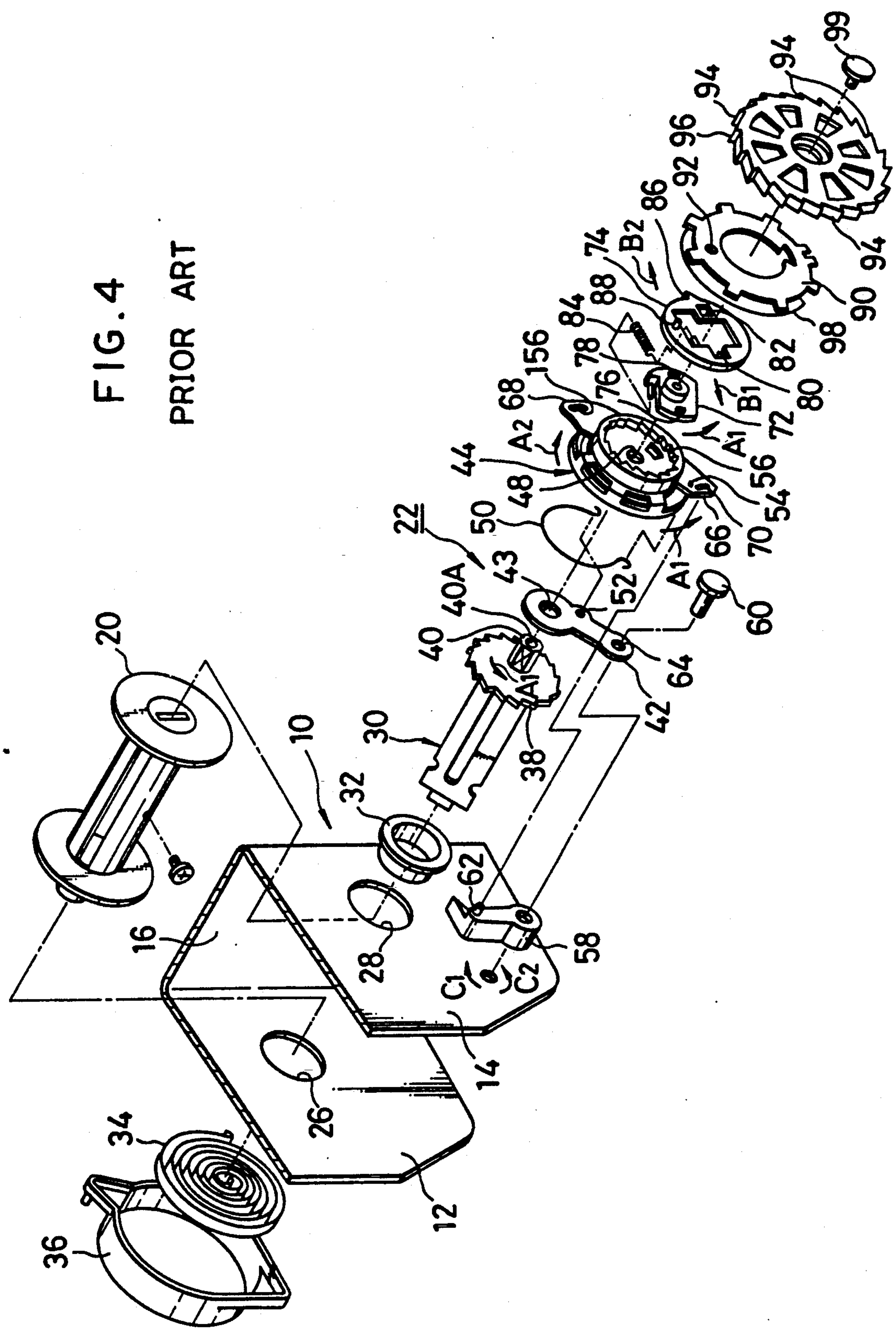
FIG. 4 is an exploded perspective view of a reel lock mechanism.
Figure 5:
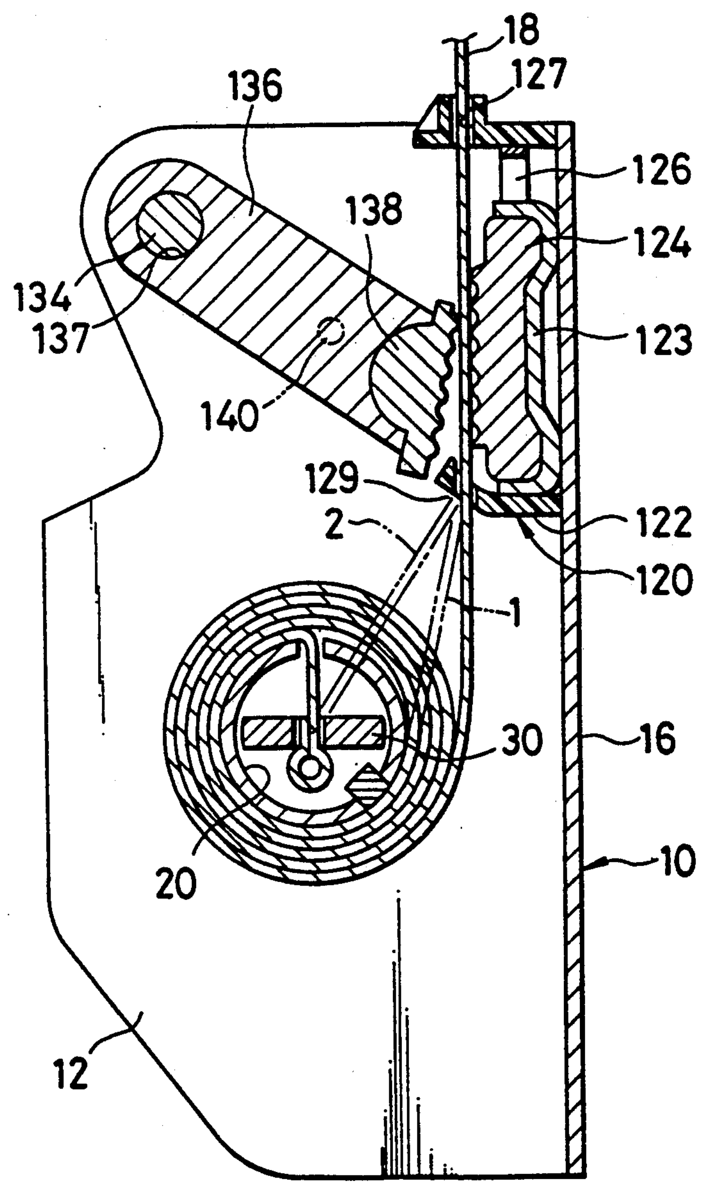
FIG. 5 is a vertical sectional view of the seat belt retractor taken along the line III—III of FIG. 3.
Figure 6:
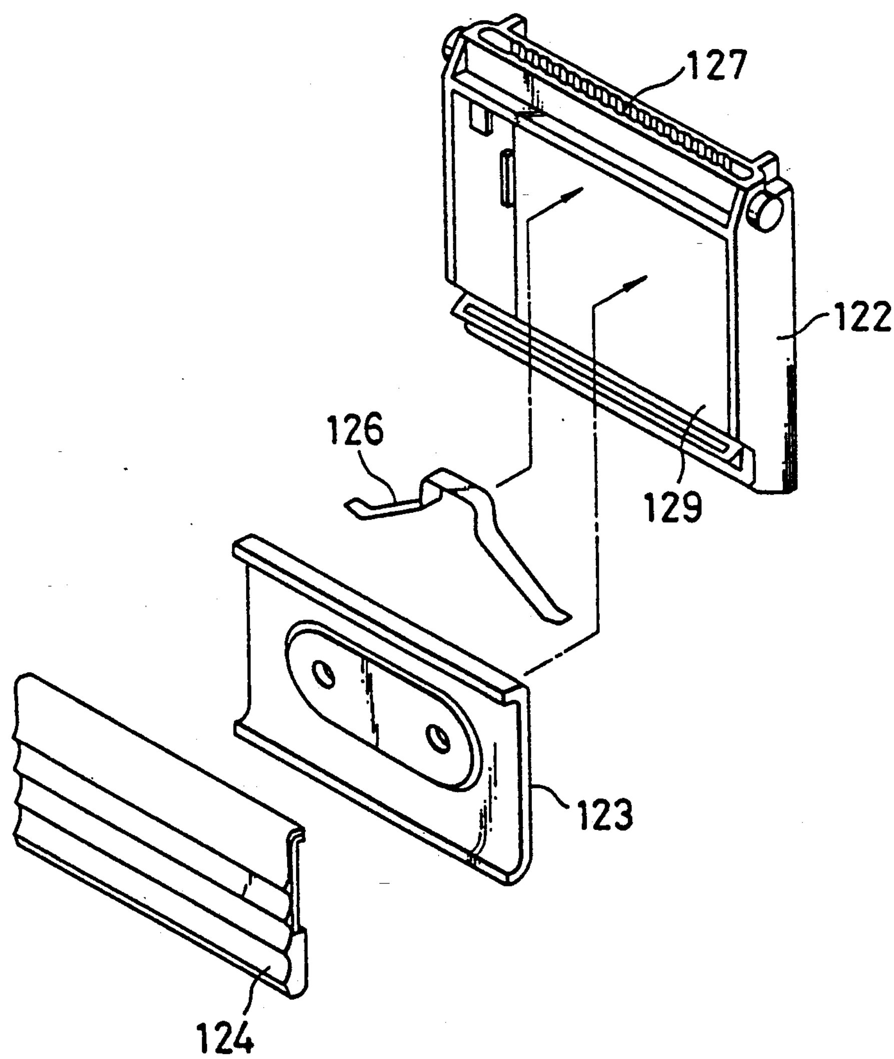
FIG. 6 is a perspective view of a guide member.

FIG. 1 is an exploded view of a seat belt retractor according to one embodiment of the present invention, and FIG. 2 is a vertical sectional view of the seat belt retractor. In FIGS. 1 and 2, like elements are indicated by like reference numerals as used in the prior art and will not be described.

In the embodiment shown in FIG. 2, an angle $\alpha$ is 18.1°. An angle $\beta$ is 14°.

The angle $\alpha$ is an angle at which a line a intersects a perpendicular line relative to the rear wall 16'. The perpendicular line h extends perpendicularly from the central axis of the shaft 134' to the rear wall 16' of the frame. The line a extends from a front edge 138a' of the second gripping member 136' when the second gripping member 136' is brought into contact with the seat belt 18' to the central axis of the shaft 134'.

The angle $\beta$ is defined between the end surface of the pusher 138' when contacting with the seat belt 18' and the rear wall 16' of the frame.

With the seat belt retractor thus constructed, the front edge 138a' of the second gripping member is brought into contact with the seat belt 18' at the initial stage of a locking operation, and then it is started to grip the seat belt 18' between the gripping members 120' and 136'. Thus, the seat belt 18' is sandwiched firmly between the two gripping members 120' and 136'. At this time, the pusher 138' comes into contact with the seat belt 18' at a deep or large angle. This results in concentration of a gripping force on the front edge 138a' of the second gripping member. Under the circumstances, when a pulling force is applied from the seat belt 18' to the second gripping member 136', the latter is rotated in a direction toward the perpendicular line h so as to rapidly sandwich the seat belt 18' between the two gripping members 120' and 136'.

The receiver 124' and the pusher 138' thus need not to have a sharply rugged or serrated surface in contact with the seat belt 18'. This prevents the seat belt 18' from being napped. In the illustrated embodiment, the contact surfaces of the receiver 124' and the pusher 138' are rugged with round edges rather than sharp edges.

In this embodiment, a metallic rod 180' extends between the side walls 12' and 14' of the frame 10' in order to reinforce the slot 129' of the guide member 122' made of synthetic resin. 182' and 184' are mounting holes defined in the side walls 12' and 14' of the frame to receive the rod 180'.

In the present invention, the angle $\alpha$ is preferably in the range of between 10° and 19° and most preferably between 15° and 19°. The angle $\beta$ is preferably in the range of between 13° and 25° and most preferably between 13° and 18°.

We claim:

1. A seat belt retractor for retracting a seat belt, comprising:

a frame including a pair of opposite side walls and a rear wall extending between the side walls, a seat belt take-up reel extending between the side walls of the frame, a first gripping member mounted on the rear wall of the frame having a substantially flat belt-gripping surface provided with small gripping projections of substantially equal height, the tips of said projections contained in a first plane, a shaft extending between the side walls of the frame, a second gripping member having a support hole at one end and a free end at another end, said support hole receiving the shaft so that the second gripping member is pivotally supported by the frame, said second gripping member being rotatable between a position where the free end is overlapped with the first gripping member to hold the seat belt therebetween and a position located away from the first gripping member, said free end of the second gripping member having a substantially flat belt-gripping surface provided with small gripping projections of substantially equal height, the tips of said projections contained in a second plane, and a front edge at one side thereof, said front edge contacting the seat belt first when the second gripping member is rotated in a direction to grip the seat belt against the first gripping member, and operating means for moving the second gripping member to overlap the first gripping member upon detection of predetermined acceleration of a vehicle, wherein when the front edge of the second gripping member initially grips the seat belt against the first gripping member upon actuation of the operating means, an angle $\alpha$ is between 10° and 19°, and an angle $\beta$ is at least 13°, where the angle $\alpha$ is an acute angle defined between a line extending from the shaft axis through the front edge and a line perpendicular to the first plane and extending through the shaft axis and the angle $\beta$ is an acute angle defined between the first and second planes.

2. A seat belt retractor according to claim 1, wherein the angle $\beta$ is in the range of between 13° and 25°.

3. A seat belt retractor according to claim 1, wherein said small gripping projections of the first and second gripping members form respective rugged contact surfaces.

* * * * *